(No Model.) 2 Sheets—Sheet 1.
R. A. SCOTT.
APPARATUS FOR PROJECTING IMAGES ONTO DISTANT BODIES.
No. 534,583. Patented Feb. 19, 1895.
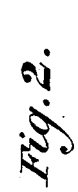
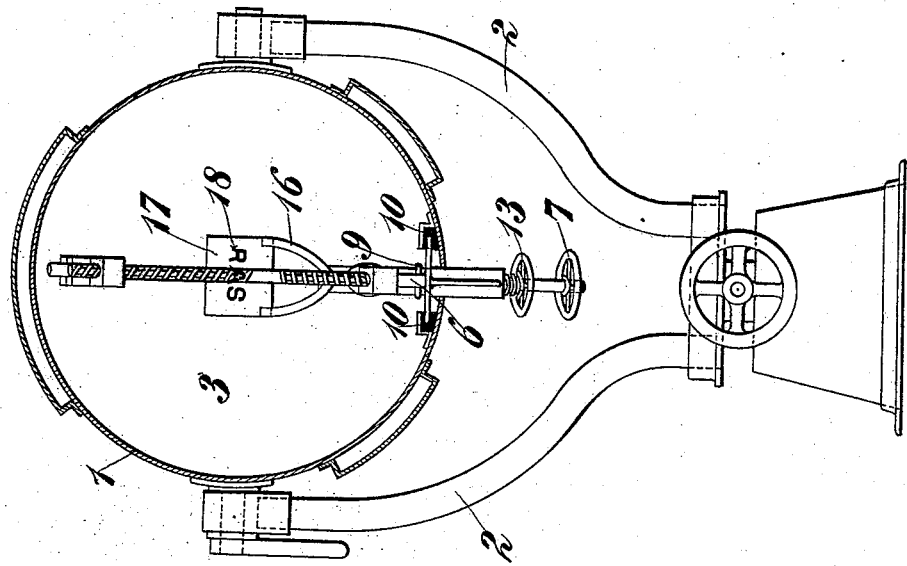
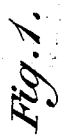
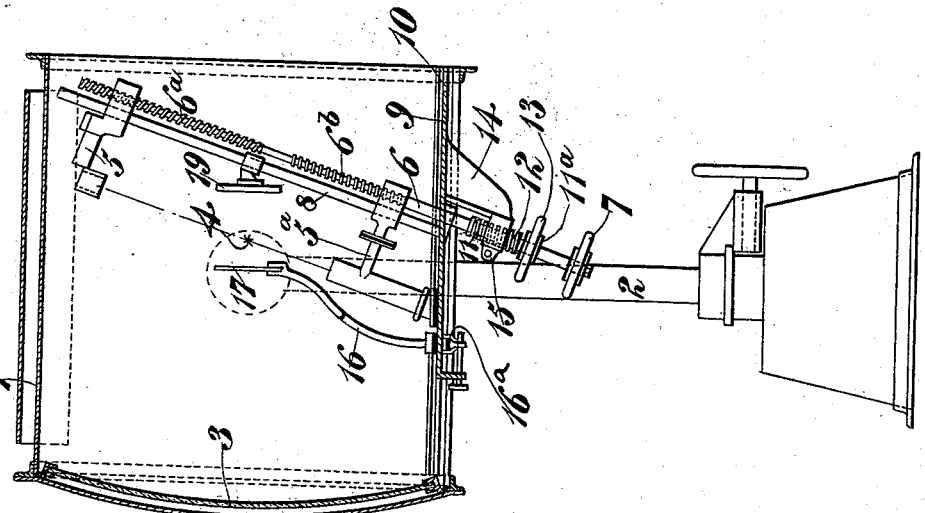
Witnesses
W. Cross.
Charles E. Brougham.
Inventor
Ronald A. Scott (No Model.)
2 Sheets—Sheet 2.
R. A. SCOTT.
APPARATUS FOR PROJECTING IMAGES ONTO DISTANT BODIES.
No. 534,583.
Patented Feb. 19, 1895.